(12) United States Patent
Wang et al.

(10) Patent No.: US 8,254,871 B2
(45) Date of Patent: Aug. 28, 2012

(54) METHOD AND SYSTEM FOR PLAYING RING BACK TONE, HOME LOCATION REGISTER AND MOBILE SWITCHING CENTER

(75) Inventors: Ping Wang, Shenzhen (CN); Jitang Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 384 days.

(21) Appl. No.: 12/564,175

(22) Filed: Sep. 22, 2009

(65) Prior Publication Data

US 2010/0022219 A1    Jan. 28, 2010

Related U.S. Application Data

(63) Continuation of application No. PCT/CN2008/070445, filed on Mar. 7, 2008.

(30) Foreign Application Priority Data

Mar. 22, 2007   (CN) .......................... 2007 1 0073628

(51) Int. Cl.
   *H04M 5/00* (2006.01)
(52) U.S. Cl. ........................................ 455/401; 379/257
(58) Field of Classification Search ............. 379/215.01, 379/257; 455/401, 412.1, 414.1, 567
   See application file for complete search history.

(56) References Cited

U.S. PATENT DOCUMENTS

| 7,174,009 B1 | 2/2007 | Zhang et al. |
| 2006/0023862 A1 | 2/2006 | Sutcliffe |
| 2006/0153355 A1* | 7/2006 | Wang et al. ............... 379/215.01 |
| 2007/0003047 A1 | 1/2007 | Batni et al. |
| 2007/0123311 A1* | 5/2007 | Kim et al. ..................... 455/567 |
| 2007/0218877 A1* | 9/2007 | Mills ........................ 455/414.1 |

FOREIGN PATENT DOCUMENTS

| CN | 1553720 A | 12/2004 |
| CN | 165632 A | 8/2005 |
| CN | 1658632 A | 8/2005 |
| CN | 101047891 A | 10/2007 |
| EP | 1617640 A1 | 1/2006 |

(Continued)

OTHER PUBLICATIONS

Office Action issued in corresponding Chinese Patent Application No. 2007100736284, received Jul. 18, 2008.

(Continued)

*Primary Examiner* — Patrick Edouard
*Assistant Examiner* — Myron K Wyche
(74) *Attorney, Agent, or Firm* — Brinks Hofer Gilson & Lione

(57) ABSTRACT

A ring back tone playing method and system, a home location register and a mobile switching center, the method comprises the calling side mobile switching center transmitting a route request message to the called side home location register when the calling side mobile switching center has received the call request transmitted from the calling terminal to the called terminal; the calling side mobile switching center receiving the ring back tone service identifier returned from the called side home location register which instructs that the called side home location register has got the called terminal's absence response message and the called terminal has customized a ring back tone service; the calling side mobile switching center instructing the playing device to play the ring back tone to the calling terminal according to the ring back tone service identifier.

17 Claims, 2 Drawing Sheets

FOREIGN PATENT DOCUMENTS

KR   20050116251 A   12/2005

OTHER PUBLICATIONS

Office Action issued in corresponding Chinese Patent Application No. 2007100736284, mailed Mar. 6, 2009.

Office Action issued in corresponding Chinese Patent Application No. 2007100736284, mailed Jun. 9, 2010.

Written Opinion of the International Searching Authority issued in corresponding PCT Patent Application No. PCT/CN2008/070445, mailed Jun. 19, 2008.

Extended European Search Report issued in corresponding European Patent Application No. 08715181.7, mailed Dec. 5, 2011.

* cited by examiner

METHOD AND SYSTEM FOR PLAYING RING BACK TONE, HOME LOCATION REGISTER AND MOBILE SWITCHING CENTER

CROSS REFERENCE TO RELATED APPLICATIONS

This application is a continuation of International Patent Application No. PCT/CN2008/070445, filed on Mar. 7, 2008, which claims priority to Chinese Patent Application No. 200710073628.4, filed on Mar. 22, 2007, both of which are hereby incorporated by reference in their entirety.

FIELD OF THE INVENTION

The present invention relates to the communication field, and in particular to a method and system for playing ring back tone, and a home location register and a mobile switching center.

BACKGROUND

With the constant development of the telecommunication technology, requirements for communication services are increasingly improved, thus many individual communication services come forth. Ring back tone service is one of such individual communication services. The ring back tone service is also called a color ring service. When the subscriber who has registered this service is the called subscriber, instead of a general ring back tone, a section of voice customized previously may be sent to the calling subscriber, so as to meet the subscriber's individual requirement.

During the implementation of the invention, the inventors found at least the following problems in the conventional art, that is, the current ring back tone service may play a section of voice customized by the called side to the calling subscriber, only when the voice link is connected.

SUMMARY

In view of this, in order to play a section of voice customized by the called side to the calling subscriber when the voice link is not connected, embodiments of the present invention provide a method for playing ring back tone.

Embodiments of the present invention further provide a system for playing ring back tone.

Embodiments of the present invention further provide a home location register.

Embodiments of the present invention further provide a mobile switching center.

The method for playing ring back tone includes the following steps. A calling side mobile switching center transmits a route request message to a called side home location register after the calling side mobile switching center receives a calling request transmitted from a calling terminal to a called terminal. The calling side mobile switching center receives an identifier of a ring back tone service returned from the called side home location register. The identifier of the ring back tone service is an identifier returned to the calling side mobile switching center when the called side home location register acquires an absence response message of the called terminal and determines that the called terminal has customized the ring back tone service. The calling side mobile switching center instructs a playing device to play the ring back tone to the calling terminal according to the identifier of the ring back tone service.

The system for playing ring back tone includes a called side home location register, a calling side mobile switching center and a playing device. The called side home location register is configured to receive a route request message transmitted from the calling side mobile switching center, acquire an absence response message of a called terminal, determine that the called terminal has customized a ring back tone service, and return an identifier of the ring back tone service to the calling side mobile switching center. The calling side mobile switching center is configured to receive a calling request transmitted from a calling terminal to the called terminal, transmit the route request message to the called side home location register, receive the identifier of the ring back tone service returned by the called side home location register, and instruct the playing device to play a ring back tone to the calling terminal according to the identifier of the ring back tone service.

The home location register includes a called terminal state acquiring unit and a ring back tone service processing unit. The called terminal state acquiring unit is configured to acquire an absence response message of a called terminal. The ring back tone service processing unit is configured to determine that that the called terminal has customized a ring back tone service according to the absence response message, transmit an identifier of the ring back tone service to a calling side mobile switching center, and instruct the calling side mobile switching center to initiate service flow of playing the ring back tone according to the identifier.

The mobile switching center includes a calling side processing unit, an identifier acquiring unit and a ring back tone service triggering unit. The calling side processing unit is configured to receive a call from a calling terminal, and transmit a route request message to a called side home location register. The identifier acquiring unit is configured to acquire an identifier of a ring back tone service which is returned by the called side home location register after receiving an absence response message from the called terminal. The ring back tone service triggering unit is configured to instruct a playing device to play a ring back tone to the calling terminal according to the identifier of the ring back tone service.

The embodiments of the present invention may acquire absence response message of the called terminal through the called location register, determine that the called terminal has customized the ring back tone service, transmit identifier of the ring back tone service to the calling side mobile switching center, and instruct the calling side mobile switching center to initiate service flow of playing ring back tone according to the identifier. In this manner, the present invention may play ring back tone customized by the called terminal to the calling terminal in case that the tone link is not connected, which further improves the ring back tone service and satisfies individual requirements for subscribers.

DETAILED DESCRIPTION

Figure 1:
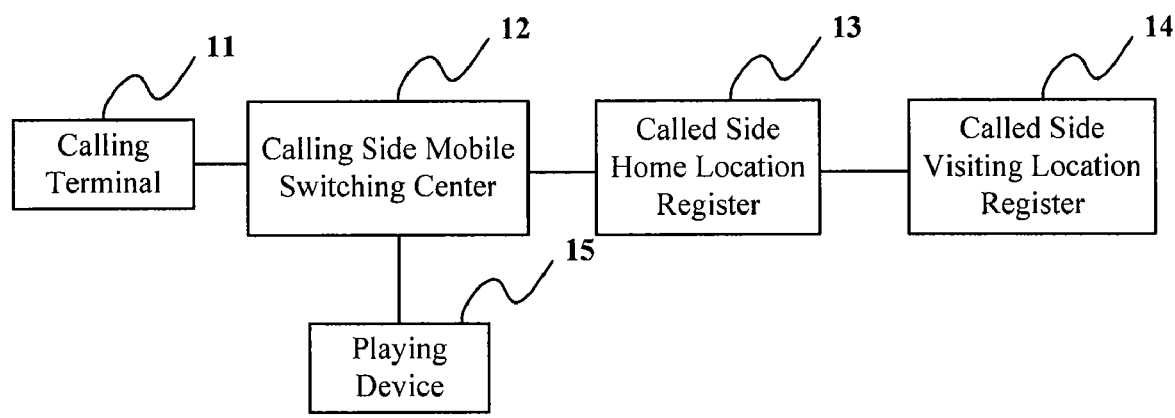
FIG. 1 is a block diagram of a system for playing ring back tone according to embodiments of the present invention.

FIG. 1 is a block diagram of the system for playing ring back tone according to embodiments of the present invention. As illustrated in the FIG. 1, the system includes: a calling terminal 11, a calling side mobile switching center 12, a called side home location register 13, a called side visiting location register 14 and a playing device 15.

The calling side mobile switching center 12 is configured to receive a calling request from the calling terminal 11, and transmit a route request message to the called side home location register 13.

The called side home location register 13 receives the route request message transmitted from the calling side mobile switching center 12, and acquires the called roaming number from the called side visiting location register 14. The called side visiting location register 14 transmits an absence response message of the called terminal to the called side home location register 13 when it is determined that the called terminal is unavailable, for example, the called terminal is power off, the called terminal is not in the service zone, or the called terminal is busy, etc. The called side home location register 13 receives the absence response message of the called terminal, and returns an identifier of a ring back tone service to the calling side mobile switching center 12 when it is determined that the called terminal has customized the ring back tone service.

The calling side mobile switching center 12 instructs the playing device 15 to play a ring back tone to the calling terminal 11 according to the identifier of the ring back tone service returned from the called side home location register 13. In one embodiment of the present invention, the calling side mobile switching center 12 transmits an original address message to the playing device 15, and the playing device 15 plays the ring back tone to the calling terminal 11 according to the original address message.

In the system as described above, the called side home location register 13 determines whether the called terminal has customized the ring back tone service by inquiring whether the called terminal has set a flag for the ring back tone service. The flag for the ring back tone service set by the subscriber may be stored in the called side home location register 13 or any other network element.

In the system for playing ring back tone according to embodiments of the present invention, when the called terminal that has customized the ring back tone service is unavailable, there are two manners as follows to play the ring back tone to the calling terminal 11 by the system.

(1) When the called terminal that has customized the ring back tone service is unavailable, the called side home location register 13 returns the identifier of the ring back tone service to the calling side mobile switching center 12 after the called side home location register 13 has acquired the absence response message of the called terminal, without distinguishing which absence state the called terminal is in, i.e. whether the called terminal is power off, or is not in the service zone, or is busy, etc. The identifier of the ring back tone service may particularly include the flag preset by the called terminal indicating customization of the ring back tone service, as well as address of the playing device 15. The calling side mobile switching center 12 shields the original tone from the calling side mobile switching center according to the flag, and transmits the original address message to the playing device 15 according to the address of the playing device 15. Here, the original address message includes number identifier of the calling terminal 11 and number identifier of the called terminal. The playing device 15 acquires the ring back tone preset by the called terminal according to the number identifier of the called terminal, and plays the ring back tone to the calling terminal 11 according to the number identifier of the calling terminal 11. In this manner, the playing device 15 may store a ring back tone preset by the called terminal subscriber.

(2) When the called terminal that has customized the ring back tone service is unavailable, the called side home location register 13 returns the identifier of the ring back tone service to the calling side mobile switching center 12 after the called side home location register 13 has acquired the absence response message of the called terminal, distinguishing which absence state the called terminal is in, i.e. whether the called terminal is power off, or is not in the service zone, or is busy, etc. The identifier of the ring back tone service particularly includes the flag preset by the called terminal indicating customization of the ring back tone service, address of the playing device 15, and absence state indicator of the called terminal which is used to identify the absence state of the called terminal. The calling side mobile switching center 12 shields the original tone from the calling side mobile switching center according to the flag, and transmits the original address message to the playing device 15 according to the address of the playing device 15. Here, the original address message includes the absence state indicator of the called terminal, number identifier of the calling terminal 11 and number identifier of the called terminal. The playing device 15 acquires various ring back tones for the ring back tone service preset by the called terminal with respect to different absence states according to the absence state indicator and the number identifier of the called terminal, and plays the ring back tone to the calling terminal 11 according to the number identifier of the calling terminal 11. In this manner, the playing device 15 may store a plurality of ring back tones for the ring back tone service preset by the called terminal subscriber with respect to the individual absence state.

Figure 2:
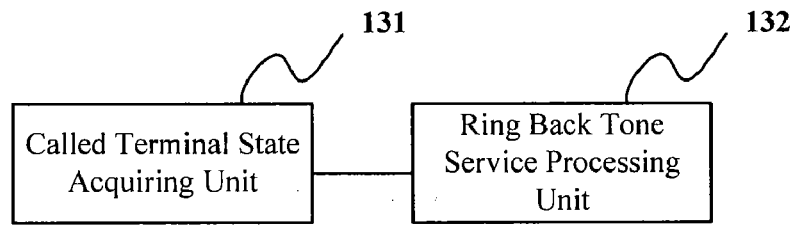
FIG. 2 is a block diagram of a home location register according to embodiments of the present invention.

The embodiments of the present invention are further described based on the FIG. 1 and in connection with the FIG. 2. As shown in the FIG. 2, the called side home location register 13 further includes a called terminal state acquiring unit 131 and a ring back tone processing unit 132.

The called terminal state acquiring unit 131 is configured to acquire the absence response message of the called terminal. In one embodiment of the present invention, the called terminal state acquiring unit 131 transmits a request message for the called roaming address to the called side visiting location register 14 according to the route request message transmitted from the calling side mobile switching center 12, so as to acquire the called roaming address. The called side visiting location register 14 may return the absence response message of the called terminal to the called terminal state acquiring unit 131 if it is determined that the called terminal is unavailable, for example, the called terminal is power off, the called terminal is busy, or the called terminal is not in the service zone, etc.

The ring back tone processing unit 132 is configured to transmit the identifier of the ring back tone service to the calling side mobile switching center 12 according to the absence response message of the called terminal acquired by the called terminal state acquiring unit 131 when it is determined that the called terminal has customized the ring back tone service, and instruct the calling side mobile switching center 12 to initiate the service flow of playing the ring back tone according to the identifier of the ring back tone service. In one embodiment of the present invention, the ring back tone processing unit 132 determines whether the called terminal has customized the ring back tone service by inquiring whether the called terminal has set the flag for the ring back tone service. The flag for the ring back tone service set by the subscriber may be stored in the called side home location register 13 or any other network element. The identifier of the ring back tone service returned from the ring back tone processing unit 132 to the calling side mobile switching center 12 may particularly include the flag preset by the called terminal indicating customization of the ring back tone service, as well as address of the playing device 15. The identifier may be used to instruct the calling side mobile switching center 12 to shield the original tone from the calling side mobile switching center according to the flag, and to instruct the playing device 15 to play the ring back tone to the calling terminal 11 according to the address of the playing device 15.

Figure 3:
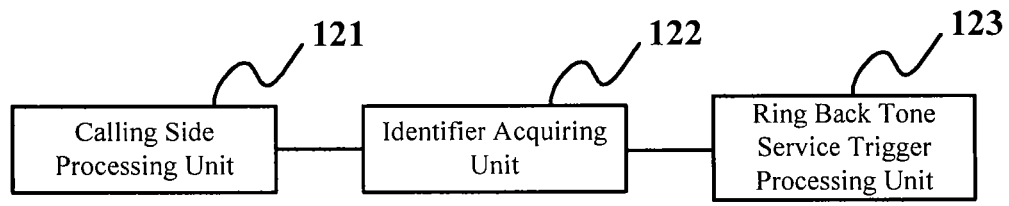
FIG. 3 is a block diagram of a mobile switching center according to embodiments of the present invention.

The embodiments of the present invention are further described based on the FIG. 1 and in connection with the FIG. 3. As shown in the FIG. 3, the calling side mobile switching center 12 further includes a calling side processing unit 121, an identifier acquiring unit 122 and a ring back tone service triggering unit 123.

The calling side processing unit 121 is configured to receive calls from the calling terminal 11, and transmit the route request message to the called side home location register 13.

The identifier acquiring unit 122 is configured to acquire the identifier of the ring back tone service returned by the called side home location register 13 after the called side home location register 13 has received the absence response message returned by the called terminal.

The ring back tone service triggering unit 123 is configured to instruct the playing device 15 to play the ring back tone to the calling terminal 11 according to the identifier of ring back tone service.

In one embodiment of the present invention, the identifier of the ring back tone service received by the identifier acquiring unit 122 particularly includes the flag preset by the called terminal indicating customization of the ring back tone service, as well as address of the playing device 15. The ring back tone service triggering unit 123 shields the original tone from the calling side mobile switching center according to the flag, and instructs the playing device 15 to play the ring back tone to the calling terminal 11 according to the address of the playing device 15.

In one embodiment of the present invention, the called terminal roaming address is acquired from the called side visiting location register 14 after the called side home location register 13 has received the route request message from the calling side mobile switching center 12. When the absence response message of the called terminal returned from the called side visiting location register 14 is acquired and it is determined that the called terminal subscriber has customized the ring back tone service, the identifier of the ring back tone service is returned to the calling side mobile switching center 12. The calling side mobile switching center 12 instructs the playing device 15 to play the ring back tone to the calling terminal 11 according to the identifier of the ring back tone service, so as to play the ring back tone set by the subscriber who has customized the ring back tone service to the calling terminal instead of the simple ring back tone played by the switch at present (such as "the subscriber you dialed is power off", "the subscriber you dialed is not in the service zone", or "the subscriber you dialed is busy", etc.) in the state that the voice link is not connected (for example, the called terminal is power off, the called terminal is busy, or the called terminal is not in the service zone, etc.), which further improves the ring back tone service, makes it possible to the calling terminal to hear a dulcet ring back tone even when the call from the calling terminal to the called terminal fails such that the humanization of the system is improved and the individuate requirements of the subscribers are satisfied. In one embodiment of the present invention, different ring back tones may be displayed to the calling terminal 11 by distinguishing which absence state the called terminal is in, i.e. distinguishing whether the called terminal is power off, is not in the service zone, or is busy, etc., which further satisfies the individuate requirements of the subscribers. For example, if the called terminal subscriber can't use the original terminal number used before for some reason, but uses a new terminal number (for example, the subscriber changes the number and cancels the original terminal number used before, or the terminal number used before by the subscriber is lost, and so on), the calling terminal will hear the ring back tone of "the number you dialed does not exist", or "the subscriber you dialed is not in the service zone" when the calling terminal subscriber dials the original terminal number used before by the called terminal subscriber. However, the called terminal subscriber may preset the ring back tone by customizing the ring back tone service of the embodiments of the present invention to play the ring back tone such as "the subscriber you dialed has changed, and the new number is *********" to the calling terminal subscriber when the calling terminal subscriber dials the original terminal number used before by the called terminal subscriber.

Figure 4:
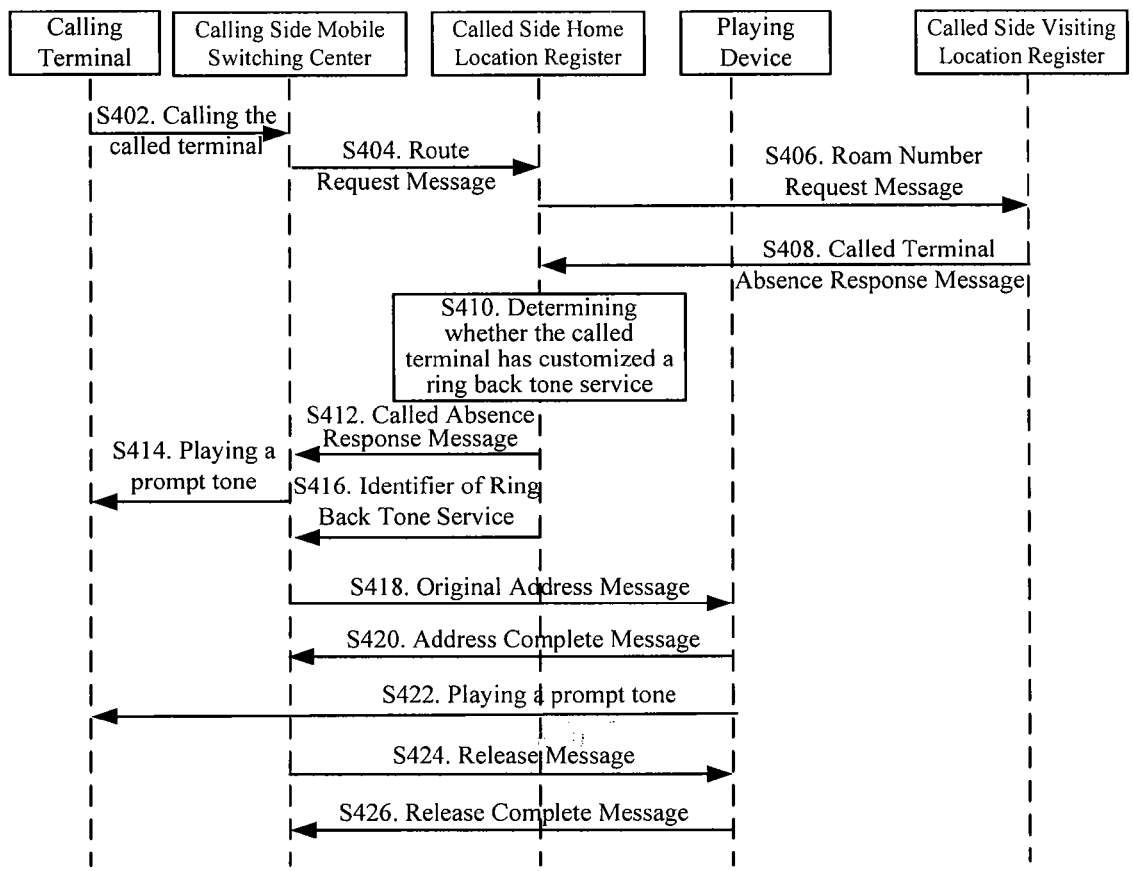
FIG. 4 is a flow chart of a method for playing ring back tone according to embodiments of the present invention.

FIG. 4 shows a method for playing the ring back tone according to embodiments of the present invention. As illustrated by the figure, the method includes the following steps.

Step S402: The calling terminal initiates a call to the called terminal, and the call is forwarded via the calling side mobile switching center.

Step S404: The calling side mobile switching center transmits the route request message to the called side home location register according to the called terminal number in the call so as to acquire the route message for the called terminal.

Step S406: The called side home location register transmits the roaming number request message to the called side visiting location register to acquire the roaming address of the called terminal.

Step S408: The called side visiting location register transmits the absence response message of the called terminal to the called side home location register when it is determined that the called terminal is unavailable, for example, the called terminal is power off, the called terminal is busy, or the called terminal is not in the service zone.

Step S410: The called side home location register determines whether the called terminal has customized the ring back tone service after receiving the absence response message of the called terminal. If the called terminal does not customize the ring back tone service, the process proceeds to the step S412; while if the called terminal has customized the ring back tone service, the process proceeds to the step S416. In one embodiment of the present invention, the called side home location register determines whether the called terminal has customized the ring back tone service by inquiring whether the called terminal has set the flag for the ring back tone service. The flag for the ring back tone service set by the subscriber may be stored in the called side home location register or any other network element.

Step S412: The called side home location register transmits the absence response message of the called terminal to the calling side mobile switching center.

Step S414: According to the absence response message, the calling side mobile switching center plays the original ring back tone to the calling terminal, for example, "the subscriber you dialed is power off", "the subscriber you dialed is not in the service zone", or "the subscriber you dialed is busy", and so on. Then the flow of the method is ended.

Step S416: The called side home location register returns the identifier for the ring back tone service to the calling side mobile switching center, and instructs the calling side mobile switching center to initiate the service flow of playing the ring back tone according to the identifier.

Step S418: The calling side mobile switching center instructs the playing device to play the ring back tone to the calling terminal according to the identifier of the ring back tone service.

Step S420: The playing device transmits an address complete message to the calling side mobile switching center.

Step S422: The playing device plays the ring back tone to the calling terminal.

Step S424: The calling side mobile switching center instructs the playing device to stop playing the ring back tone to the calling terminal when the calling terminal is on-hook or the calling terminal gives no answer overtime. In one embodiment of the present invention, when the calling terminal is on-hook, release message is transmitted to the calling side mobile switching center. The calling side mobile switching center transmits a release complete message to the calling terminal according to the release message, and transmits the release message to the playing device. If the calling terminal gives no answer over a specified time period, the calling side mobile switching center may alternatively transmit a resource release message to the calling terminal, and transmit the resource release message to the playing device.

Step S426: The playing device stops playing the ring back tone to the calling terminal according to the resource release message, and transmits the release complete message to the calling side mobile switching center.

In the method for playing ring back tone according to the embodiments of the present invention, there are two manners as follows to play the ring back tone to the calling terminal.

(1) When the called terminal that has customized the ring back tone service is unavailable, the called side home location register returns the identifier of the ring back tone service to the calling side mobile switching center after the called side home location register has acquired the absence response message of the called terminal, without distinguishing which absence state the called terminal is in, i.e. whether the called terminal is power off, or is not in the service zone, or is busy, etc. The identifier of the ring back tone service may particularly include the flag preset by the called terminal indicating customization of the ring back tone service, as well as address of the playing device.

In particular, the called side home location register transmits to the calling side mobile switching center a response to the route request message, and fills the roaming address field in the response to the route request message with the flag and the address of the playing device.

The calling side mobile switching center shields the playing of the original tone from the calling side mobile switching center according to the flag, and transmits the original address message to the playing device according to the address of the playing device. The original address message includes the number identifier of the calling terminal and the number identifier of the called terminal. The playing device acquires the ring back tone preset by the called terminal according to the number identifier of the called terminal, and plays the ring back tone to the calling terminal according to the number identifier of the calling terminal. In this manner, the playing device may store a ring back tone preset by the called terminal subscriber.

(2) When the called terminal that has customized the ring back tone service is unavailable, the called side home location register returns the identifier of the ring back tone service to the calling side mobile switching center after the called side home location register has acquired the absence response message of the called terminal, distinguishing which absence state the called terminal is in, i.e. whether the called terminal is power off, or is not in the service zone, or is busy, etc. The identifier of the ring back tone service particularly includes the flag preset by the called terminal indicating customization of the ring back tone service, address of the playing device, and absence state indicator of the called terminal which is used to identify the absence state of the called terminal.

In particular, the called side home location register transmits to the calling side mobile switching center a response to the route request message, and fills the roaming address field in the response to the route request message with the flag, the address of the playing device, and the absence state indicator of the called terminal.

The calling side mobile switching center shields the original tone from the calling side mobile switching center according to the flag, and transmits the original address message to the playing device according to the address of the playing device. Here, the original address message includes the absence state indicator of the called terminal, number identifier of the calling terminal and number identifier of the called terminal.

In particular, the calling side mobile switching center fills the called number field in the original address message transmitted to the playing device with the absence state indicator and the number identifier of the called terminal;

The playing device acquires various ring back tones for the ring back tone service preset by the called terminal with respect to different absence states according to the absence state indicator and the number identifier of the called terminal, and plays the ring back tone to the calling terminal according to the number identifier of the calling terminal. In this manner, the playing device may store a plurality of ring back tones for the ring back tone service preset by the called terminal subscriber with respect to the individual absence state.

In one embodiment of the present invention, the playing device may be an enhanced intelligent peripheral equipment.

In the method for displaying ring back tone as described above, the called side home location register transmits the response to the route request message to the calling side mobile switching center after it has acquired the absence response message of the called terminal, and instructs the calling side mobile switching center to initiate the service flow of playing the ring back tone to play the ring back tone to the calling terminal, which makes it possible for the calling terminal to hear a dulcet ring back tone even when the call from the calling terminal to the called terminal fails such that the individuate requirements of the subscribers are satisfied. In the method for playing ring back tone according to the embodiments of the present invention, the called side home location register transmits the response to the route request message to the calling side mobile switching center, and fills the roaming number field in the response to the route request message with the identifier of the ring back tone service. The calling side mobile switching center identifies whether the roaming number field in the response to the route request message includes the identifier of the ring back tone service to determine whether to instruct the playing device to play the ring back tone to the calling terminal without any new signaling added between the called side home location register and the calling side mobile switching center, which may mitigate the burden on the called side home location register and the calling side mobile switching center, as well as the complexity of the system. When the calling side mobile switching center instructs the playing device to play the ring back tone to the calling terminal, it transmits the original address response to the playing device, and fills the called number field of the original address message with the absence state indicator and the number identifier of the called terminal. The playing device acquires the ring back tone for the ring back tone service according to the embodiments of the present invention that is set for the called terminal according to the absence state indicator and the number identifier of the called terminal, and plays the tone to the calling terminal without any new signaling added between the calling side mobile switching center and the playing device, which may mitigate the burden on the calling side mobile switching center and the playing device, as well as the complexity of the system.

Through the above description of the embodiments, those skilled in the art may understand that implementation of whole or part of the steps in the method according to the above embodiments may be implemented by instructing hardware via a program. The program may be stored in a computer (which may be a personal computer, a server, or a network equipment, etc.) readable storage medium. The storage medium may be, for example, ROM/RAM, disk, disc, etc.

The above is the description to the special embodiments of the present invention. Improvement may be made to the method of the present invention in special implementations depending on special needs in special cases. Therefore, it may be appreciated that, the embodiments according to the present invention are only illustrative and not intended to limit the scope of the present invention.

What is claimed is:

1. A method for playing ring back tone comprising:
    transmitting, by a calling side mobile switching center, a route request message to a called side home location register after the calling side mobile switching center receives a calling request transmitted from a calling terminal to a called terminal;
    receiving, by the calling side mobile switching center, a response to the route request message returned from the called side home location register, wherein a roaming number field in the response to the route request message is filled with an identifier of a ring back tone service, wherein the identifier of the ring back tone service is an identifier returned to the calling side mobile switching center when the called side home location register acquires an absence response message of the called terminal and determines that the called terminal has customized the ring back tone service;
    identifying, by the calling side mobile switching center, whether the roaming number field in the response to the route request message includes the identifier of the ring back tone service to determine whether to instruct the playing device to play the ring back tone to the calling terminal; and
    instructing, by the calling side mobile switching center, a playing device to play the ring back tone to the calling terminal when the roaming number field in the response to the route request message includes the identifier of the ring back tone service.

2. The method of claim 1, wherein:
    determining that the called terminal has customized the ring back tone service comprises:
    determining that the called terminal has customized the ring back tone service when inquiring, according to the called terminal number, that the called terminal has preset a flag indicating customization of the ring back tone service.

3. The method of claim 1, wherein:
    the identifier of the ring back tone service comprises a flag preset by the called terminal indicating customization of the ring back tone service and an address of the playing device;
    wherein the method further comprises shielding, by the calling side mobile switching center, the playing of the original tone from the calling side mobile switching center according to the flag indicating customization of the ring back tone service; and
    wherein instructing a playing device to play the ring back tone to the calling terminal according to the identifier of the ring back tone service comprises instructing the playing device to play the ring back tone to the calling terminal according to the address of the playing device.

4. The method of claim 3, wherein:
    the identifier of the ring back tone service further comprises an absence state indicator of the called terminal which is used to identify absence state of the called terminal; and
    wherein instructing the playing device to play the ring back tone to the calling terminal according to the address of the playing device comprises:
    instructing the playing device to play the ring back tone to the calling terminal according to the absence state indicator and the address of the playing device.

5. The method of claim 4, wherein instructing the playing device to play the ring back tone to the calling terminal according to the absence state indicator and the address of the playing device comprises:
    transmitting, by the calling side mobile switching center, the original address message to the playing device according to the address of the playing device, and the original address message comprising the absence state indicator of the called terminal, number identifier of the calling terminal and number identifier of the called terminal; and
    acquiring, by the playing device, various ring back tones for the ring back tone service preset by the called terminal with respect to different absence states according to the absence state indicator and the number identifier of the called terminal, and playing the ring back tone to the calling terminal according to the number identifier of the calling terminal.

6. A system for playing ring back tone comprising a called side home location register, and a calling side mobile switching center, wherein:
    the called side home location register is configured to receive a route request message transmitted from the calling side mobile switching center, acquire an absence response message of a called terminal, determine that the called terminal has customized a ring back tone service, and return a response to the route request message to the calling side mobile switching center, wherein a roaming number field in the response to the route request message is filled with an identifier of a ring back tone service; and
    the calling side mobile switching center is configured to receive a calling request transmitted from a calling terminal to the called terminal, transmit the route request message to the called side home location register, receive the response to the route request message returned by the called side home location register, identify whether the roaming number field in the response to the route request message includes the identifier of the ring back tone service to determine whether to instruct the playing device to play the ring back tone to the calling terminal, and instruct a playing device to play a ring back tone to the calling terminal when the roaming number field in the response to the route request message includes the identifier of the ring back tone service.

7. The system of claim 6, wherein:
the called side home location register is further configured to receive the route request message transmitted from the calling side mobile switching center, acquire an absence response message of the called terminal, inquire according to the called terminal number that the called terminal has preset a flag indicating customization of the ring back tone service, and return the identifier of the ring back tone service to the calling side mobile switching center.

8. The system of claim 6, wherein:
the identifier of the ring back tone service comprises a flag preset by the called terminal indicating customization of the ring back tone service and an address of the playing device; and
the calling side mobile switching center is further configured to receive the calling request transmitted from the calling terminal to the called terminal, transmit the route request message to the called side home location register, shield the original tone playing from the calling side mobile switching center according to the flag indicating customization of the ring back tone service, and instruct the playing device to play the ring back tone to the calling terminal according to the address of the playing device.

9. The system of claim 8, wherein:
the identifier of the ring back tone service further comprises an absence state indicator of the called terminal which is used to identify absence state of the called terminal; and
the calling side mobile switching center is further configured to receive the calling request transmitted from the calling terminal to the called terminal, transmit the route request message to the called side home location register, shield the original tone playing from the calling side mobile switching center according to the flag indicating customization of the ring back tone service, and instruct the playing device to play the ring back tone to the calling terminal according to the absence state indicator and the address of the playing device.

10. The system of claim 9, wherein:
the calling side mobile switching center is further configured to receive the calling request transmitted from the calling terminal to the called terminal, transmit the route request message to the called side home location register, shield the original tone playing from the calling side mobile switching center according to the flag indicating customization of the ring back tone service, and transmit an original address message to the playing device according to the address of the playing device, the original address message comprising the absence state indicator of the called terminal, number identifier of the calling terminal and number identifier of the called terminal; and
the system further comprises a playing device, configured to acquire various ring back tones for the ring back tone service preset by the called terminal with respect to different absence states according to the absence state indicator and the number identifier of the called terminal, and play the ring back tone to the calling terminal according to the number identifier of the calling terminal.

11. A home location register comprising:
a called terminal state acquiring unit, configured to acquire an absence response message of a called terminal; and
a ring back tone service processing unit, configured to determine that the called terminal has customized a ring back tone service, according to the absence response message, transmit a response to a route request message to a calling side mobile switching center, wherein a roaming number field in the response to the route request message is filled with an identifier of a ring back tone service, and instruct the calling side mobile switching center to initiate service flow of playing the ring back tone according to the identifier.

12. The home location register of claim 11, wherein:
the ring back tone service processing unit is further configured to, after receiving the absence response message transmitted by the called terminal state acquiring unit, inquire a flag preset by the called terminal indicating customization of the ring back tone service according to the called terminal number, transmit the identifier of the ring back tone service to the calling side mobile switching center, and instruct the calling side mobile switching center to initiate service flow of playing the ring back tone according to the identifier.

13. A mobile switching center comprising:
a calling side processing unit, configured to receive a call from a calling terminal, and transmit a route request message to a called side home location register;
an identifier acquiring unit, configured to acquire an identifier of a ring back tone service from a roaming number field in a response to the route request message, wherein the route request message is returned by the called side home location register after receiving an absence response message; and
a ring back tone service triggering unit, configured to instruct a playing device to play a ring back tone to the calling terminal when the roaming number field in the response to the route request message includes the identifier of the ring back tone service.

14. The mobile switching center of claim 13, wherein:
the identifier of the ring back tone service comprises a flag preset by the called terminal indicating customization of the ring back tone service and an address of the playing device; and
the ring back tone service triggering unit is further configured to shield an original tone playing from the calling side mobile switching center according to the flag indicating customization of the ring back tone service, and instruct the playing device to play a ring back tone according to the address of the playing device.

15. The mobile switching center of claim 14, wherein:
the identifier of the ring back tone service further comprises an absence state indicator of the called terminal which is used to identify absence state of the called terminal; and
the ring back tone service triggering unit is further configured to shield the original tone playing from the calling side mobile switching center according to the flag indicating customization of the ring back tone service, and instruct the playing device to play the ring back tone to the calling terminal according to the absence state indicator and the address of the playing device.

16. The mobile switching center of claim 15, wherein:
the ring back tone service triggering unit is further configured to shield the original tone playing from the calling side mobile switching center according to the flag indicating customization of the ring back tone service, transmit an original address message to the playing device according to the address of the playing device, instruct the playing device to acquire various ring back tones for the ring back tone service preset by the called terminal with respect to different absence states according to the absence state indicator and the number identifier of the called terminal, and to play the ring back tone to the calling terminal according to the number identifier of the calling terminal, wherein
the original address message comprises the absence state indicator of the called terminal, number identifier of the calling terminal and number identifier of the called terminal.

17. A non-transitory computer readable medium, comprising computer program codes stored thereon, executable by one or more digital processor for evaluating quality inspection, wherein the computer program codes comprise:
instructions for transmitting a route request message to a called side home location register after the calling side mobile switching center receives a calling request transmitted from a calling terminal to a called terminal;
instructions for receiving a response to the route request message returned from the called side home location register, wherein a roaming number field in the response to the route request message is filled with an identifier of a ring back tone service, wherein the identifier of the ring back tone service is an identifier returned to the calling side mobile switching center when the called side home location register acquires an absence response message of the called terminal and determines that the called terminal has customized the ring back tone service;
instructions for identifying whether the roaming number field in the response to the route request message includes the identifier of the ring back tone service to determine whether to instruct the playing device to play the ring back tone to the calling terminal; and
instructions for instructing a playing device to play the ring back tone to the calling terminal when the roaming number field in the response to the route request message includes the identifier of the ring back tone service.

* * * * *